United States Patent
Taleb et al.

(10) Patent No.: US 8,688,781 B2
(45) Date of Patent: Apr. 1, 2014

(54) SYSTEM AND METHOD FOR CREATING MULTIMEDIA CONTENT CHANNEL CUSTOMIZED FOR SOCIAL NETWORK

(76) Inventors: Tarik Taleb, Heidelberg (DE); Nora Taleb, Malden, MA (US)

( * ) Notice: Subject to any disclaimer, the term of this patent is extended or adjusted under 35 U.S.C. 154(b) by 133 days.

(21) Appl. No.: 13/218,084

(22) Filed: Aug. 25, 2011

(65) Prior Publication Data

US 2012/0054278 A1    Mar. 1, 2012

Related U.S. Application Data

(60) Provisional application No. 61/377,115, filed on Aug. 26, 2010.

(51) Int. Cl.
*G06F 15/16* (2006.01)
(52) U.S. Cl.
USPC ............... 709/204; 709/206; 715/709
(58) Field of Classification Search
USPC .......................................................... 709/204
See application file for complete search history.

(56) References Cited

U.S. PATENT DOCUMENTS

| | | | |
|---|---|---|---|
| 6,611,654 B1 * | 8/2003 | Shteyn | 386/291 |
| 7,787,818 B2 | 8/2010 | Shapiro et al. | |
| 7,827,208 B2 | 11/2010 | Bosworth et al. | |
| 8,117,545 B2 * | 2/2012 | Rosenbaum et al. | 715/719 |
| 2005/0251842 A1 | 11/2005 | Benliyan | |
| 2006/0123053 A1 | 6/2006 | Scannell, Jr. | |
| 2006/0271953 A1 | 11/2006 | Jacoby et al. | |
| 2007/0150498 A1 | 6/2007 | Li et al. | |
| 2008/0005655 A1 | 1/2008 | Sankaran et al. | |
| 2008/0022309 A1 | 1/2008 | Begeja et al. | |
| 2008/0052630 A1 * | 2/2008 | Rosenbaum et al. | 715/738 |
| 2008/0091834 A1 | 4/2008 | Norton | |
| 2008/0141309 A1 * | 6/2008 | Barsness | 725/58 |
| 2008/0208607 A1 | 8/2008 | Ma et al. | |
| 2008/0281622 A1 | 11/2008 | Hoal | |
| 2009/0132527 A1 * | 5/2009 | Sheshagiri et al. | 707/5 |
| 2009/0217319 A1 | 8/2009 | Weiss | |
| 2009/0271826 A1 | 10/2009 | Lee et al. | |
| 2009/0307609 A1 | 12/2009 | Ganz et al. | |

(Continued)

FOREIGN PATENT DOCUMENTS

| | | | |
|---|---|---|---|
| WO | 2006/074304 A2 | 7/2006 | |
| WO | 2007/078494 A1 | 7/2007 | |
| WO | 2008/147069 A1 | 12/2008 | |

OTHER PUBLICATIONS

International Search Report and Written Opinion dated Mar. 23, 2012 in corresponding application PCT/US2011/049159.

*Primary Examiner* — Hamza Algibhah

(57) ABSTRACT

The present invention introduces a method, system and computer program product for automatically creating and managing a social network consisting of at least one member, automatically selecting content according to contextual information about the member(s) of the social network, automatically creating and managing a channel of the content for the member(s) of the social network, automatically scheduling and managing the playback time of the content of the channel according to contextual information about the member(s) of the social network, the features of the channel, and the features of the content, and delivering the content of the channel to the member(s) of the social network according to the schedule. The system, method, and computer program product described herein also incorporate different charging strategies that charge a user, and give a user incentives and apply a penalty in return of special actions performed by the user.

24 Claims, 9 Drawing Sheets

(56) References Cited

U.S. PATENT DOCUMENTS

| | | |
|---|---|---|
| 2010/0011008 A1 | 1/2010 | Fano et al. |
| 2010/0023584 A1* | 1/2010 | Kamdar et al. ............... 709/206 |
| 2010/0037277 A1 | 2/2010 | Flynn-Ripley et al. |
| 2010/0131895 A1* | 5/2010 | Wohlert ........................ 715/811 |
| 2010/0153572 A1* | 6/2010 | Feig et al. .................... 709/231 |
| 2010/0153989 A1* | 6/2010 | Jing et al. ........................ 725/34 |
| 2010/0169917 A1 | 7/2010 | Harboe et al. |
| 2010/0185507 A1 | 7/2010 | Tokuda |
| 2010/0251281 A1* | 9/2010 | Craner ............................ 725/23 |
| 2010/0299388 A1 | 11/2010 | Bolnick et al. |
| 2011/0038470 A1 | 2/2011 | Kent |
| 2011/0082915 A1* | 4/2011 | Carr et al. ..................... 709/219 |
| 2012/0005612 A1* | 1/2012 | Huang .......................... 715/771 |

* cited by examiner

Welcome $USERNAME
to your channel "My Personal TV"

[Logout]

[Update your profile]  [View pending invitations]  [View pending join requests]

Select content from the following sources to add it to your channel program

☒ Youtube   ☒ Daily motion   ☒ Own Uploaded Videos   ☒ Videos available at servers Tune your search

[Minimum video duration]
[Enter search keyword]
[Only content not streamed in the last 10 weeks]

Content recommendation by:

☒ Subscribers' preferences
☒ Server proximity
☒ Content popularity
☒ Friends' interest How to display search result:

Items per page?
☒ 12
☐ 25
☐ 50
☐ 100

Order items by
☒ User rating
☐ User views
☐ Publication time
☐ Explicit interest from social network

[Search]

FIG. 5

Welcome $USERNAME
         to your channel "My Personal TV"          [ Logout ]

[ Update your profile ]   [ View pending invitations ]   [ View pending join requests ]

Current Channel Program

| Time | Program |
|---|---|
| 11:00 – 12:30 | Troy |
| 12:30 - 14:00 | Parin |
| 14:00 – 16:00 | Lord of the rings |
| 16:00 – 16:30 | Dr. House |
| 16:30 – 17:00 | Dr. Phill |
| 17:00 – 17:30 | People's court |
| 17:30 – 18:00 | Home with Lisa |
| 18:00 – 20:00 | The cat in the hat |
| 20:00 – 20:45 | Prison break |
| 20:45 – 21:30 | Petite maison dans la prairie |

Content Scheduling by:
  ☐ Manual
  ☒ System recommendation
       ☒ Subscribers' preferences
       ☐ Server proximity Selected Content

- Movie 1 – Title 1   [delete]
- Movie 2 – Title 2   [delete]
- Movie 3 – Title 3   [delete]
- Movie 4 – Title 4   [delete]
- News 1 – Title 5    [delete]
- News 2 – Title 6    [delete]
- News 3 – Title 7    [delete]
- News 4 – Title 8    [delete]
- Sport 1 – Title 9   [delete]
- Sport 2 – Title 10  [delete]
- Sport 3 – Title 11  [delete]
- Sport 4 – Title 12  [delete]

[ Schedule Content ]

FIG. 7

Welcome $USERNAME
to your channel "My Personal TV"

[Logout]

[Update your profile]  [View pending invitations]  [View pending join requests]

New Channel Program

| | |
|---|---|
| 11:00 – 12:30 | Troy |
| 12:30- 14:00 | Parin |
| 14:00 – 16:00 | Lord of the rings |
| 16:00 – 16:30 | Dr. House |
| 16:30 – 17:00 | Dr. Phill |
| 17:00 – 17:30 | People's court |
| 17:30 – 18:00 | Home with Lisa |
| 18:00 – 20:00 | The cat in the hat |
| 20:00 – 20:45 | Prison break |
| 20:45 – 21:30 | Petite maison dans la prairie |
| 21:30 – 22:57 | Movie 1 – Title1 |
| 22:57 – 23:00 | CM1  [Change] |
| 23:00 – 23:57 | Sport 1 – Title 9 |
| 23:57 – 24:00 | CM2  [Change] |
| 00:00 – 00:12 | News 3 – Title 7 |
| 00:12 – 00:15 | CM3  [Change] |
| 00:15 – 01:57 | Movie 3 – Title 3 |
| 01:57 – 02:00 | CM4  [Change] |
| …. | … etc |

☒ Do you want to notify social network of program update?

[Confirm Content Scheduling]

FIG. 8

SYSTEM AND METHOD FOR CREATING MULTIMEDIA CONTENT CHANNEL CUSTOMIZED FOR SOCIAL NETWORK

CROSS-REFERENCE TO RELATED APPLICATIONS

The present application claims priority of U.S. Provisional Patent Application Ser. No. 61/377,115 filed on Aug. 26, 2010 for "A System for Creating Network Protocol based Multimedia Content Channels Customized and Streamed to Respective Social Networks from a Cloud of Content Providers", the disclosure of which is incorporated herein by reference in its entirety.

FIELD OF THE INVENTION

The present disclosure relates generally to communication networks, multimedia delivery, and social networking and, more particularly, to a system, method, and computer program product for creating network protocol based multimedia content channels customized and delivered to an associated social network from a cloud of content providers.

BACKGROUND OF THE INVENTION

Creating a full scale TV channel would require massive investments necessary for purchasing different broadcasting equipment, content, and fees for government permissions/licenses, not to mention the required staff and the required technical expertise. Basically, to create a TV channel, one would be concerned primarily about three main things, namely an appropriate multimedia-delivery infrastructure, content to stream, and audience for the channel. Regarding the multimedia delivery infrastructure, different network types could be considered; with the Internet being the most popular due to the ever growing community of users. Regarding content, there is a wide library of video media available to consumers. This content could be videos available at movie rental companies such as Netflix, HuluPlus and Blockbuster; broadcast television programs; cable or satellite television programs; and user-contributed videos such as those available at online video content providers such as YouTube, Dailymotion, etc. The audience of a channel defines a social network, i.e., a group of users with potential interest in viewing the channel content. Currently, there are many platforms available for forming social networks; popular ones include Facebook, LinkedIn, Hi5, Friendster, My YearBook, Mixi, etc.

Current video services are being delivered either on a plurality of broadcast/cable/satellite channels or at online video content providers. In case of the latter, video services are either provided singularly in the style of video/clip on demand, or in the form of playlists (e.g., WorldTV, YouTube's Leanback service). In either case, due to the high number of available channels and content, a user may spend a long time searching for a video title that could be of interest.

SUMMARY OF THE INVENTION

It is the object of the present invention to introduce a system, method, and computer program product that enable a user to create a network protocol (e.g., Internet Protocol) based multimedia content channel customized and delivered to its respective social network using content entirely or partially available at a central media server, at a peer to peer network, or distributed over a cloud of media servers administrated by the same or different content providers.

The system, method, and computer program product described herein enable a user to create and manage a social network consisting of at least one member, to select content according to information about the at least one member of the social network, to create and manage a channel of the content for the at least one member of the social network, to schedule and manage the playback time of the content of the channel according to information about the at least one member of the social network, and to deliver the content of the channel to the at least one member of the social network according to the schedule.

Content can be delivered on top of any network type (e.g., circuit switch, packet switch) and using any network protocol (e.g., Internet Protocol). The system, method, and computer program product described herein target, by way of illustration and not by way of limitation, the following users:

A parent who is concerned about what his/her children watch on TV (e.g., when he/she is not around);

A person frustrated by the time he/she spends changing from a TV channel to another, searching for a content of interest, sometimes resulting in not retrieving satisfactory content;

A person interested in watching and sharing the same content channel, anytime and anywhere, with others, such as family and friends located at different places;

A person interested in watching his/her favorite programs at his/her time of convenience and sharing them with others;

A person interested in launching his/her own TV/radio channel and continuously attracting audience to it; and A broadcasting corporate interested in launching a TV/radio channel dedicated for a particular social network.

It should be noted that in the above description, content mainly refer to video. However, content could be also audio files, pictures, news feeds, story feeds, blogs, electronic books, games, etc. In case of video content, the created channel is intuitively a TV channel. In case of audio content, it is a radio channel. In case of pictures, it is a picture channel, which may be delivered to a group of network-protocol-based digital photo frames.

In a first embodiment of the present invention, a method is provided for automatically creating and managing a social network consisting of at least one member, automatically selecting content, entirely or partially available at a central server, at a peer to peer network, and/or distributed over a cloud of servers, according to contextual information about the at least one member of the social network, automatically creating and managing a channel/list of the content for the at least one member of the social network, automatically scheduling and managing the playback time of the content of the channel according to contextual information about the at least one member of the social network, the features of the channel, and the features of the content, and delivering the content of the channel to the at least one member of the social network according to the schedule. Content may be delivered on top of any network type (e.g., circuit switch, packet switch) and using any network protocol (e.g., Internet Protocol).

In a second embodiment of the present invention, an apparatus is provided for automatically creating and managing a network protocol based multimedia content channel customized according to contextual information regarding its respective social network; the apparatus comprising: means for creating and managing a social network consisting of at least one member, means for selecting content, entirely or partially available at a central server, at a peer to peer network, and/or distributed over a cloud of servers, according to contextual information about the at least one member of the social network, means for creating and managing a channel of the content for the at least one member of the social network, means for scheduling and managing the playback time of the content of the channel according to contextual information about the at least one member of the social network, the features of the channel, and the features of the content, and means for delivering the content of the channel to the at least one member of the social network according to the schedule.

In a third embodiment of the present invention, a computer program product comprising a program storage medium readable by a computer tangibly embodying one or more programming instructions executable by the computer and configured to perform a method for automatically creating and managing a network protocol based multimedia content channel customized according to contextual information regarding its respective social network; the method comprising: means for creating and managing a social network consisting of at least one member, means for selecting content, entirely or partially available at a central server, at a peer to peer network, and/or distributed over a cloud of servers, according to contextual information about the at least one member of the social network, means for creating and managing a channel of the content for the at least one member of the social network, means for scheduling and managing the playback time of the content of the channel according to contextual information about the at least one member of the social network, the features of the social network, and the features of the content, and means for delivering the content of the channel to the at least one member of the social network according to the schedule.

In a fourth embodiment of the present invention, a method, an apparatus and a computer program product are provided for automatically creating and managing a content channel, automatically selecting content, entirely or partially available at a central server, at a peer to peer network, and/or distributed over a cloud of servers, according to contextual information about the channel, automatically scheduling and managing the playback time of the content of the channel according to contextual information about the channel and the content, automatically creating and managing a social network, for the channel, consisting of at least one member, and delivering the content of the channel to the at least one member of the social network according to the schedule.

Both channel content and their playback schedule (i.e., channel programs) are customized according to different contextual information (e.g., preferences, profiles, circumstances, etc) about members of a social network and features of the channel (e.g., channel category—TV, radio, pictures, channel type—action, news, etc), and dedicated to the social network.

The system, method, and computer program product described herein also incorporate different charging strategies that charge for the provisioned service, and give incentives and apply a penalty in return for special actions performed by the channel owner and/or the members of the social network (e.g., accepting the insertion of commercials into the channel stream, inviting new members, etc).

BRIEF DESCRIPTION OF THE DRAWINGS

The present disclosure is illustrated by way of example, and not by way of limitation, in the figures of the accompanying drawings. These drawings are merely schematic representations, intended to refer only to the particular structure of the embodiments selected for illustration in the drawings based on convenience and the ease of demonstrating the present disclosure. They are, therefore, not intended to indicate relative size and dimensions of the devices or components thereof and/or to define or limit the scope of the present disclosure. In the drawings and the following description below, identical numeric designations have been used, where possible, to refer and designate identical components and elements of like function.

Aspects, features, benefits, advantages, and teaching of the present invention can be readily understood by reference to the following detailed description and appended claims, in conjunction with the accompanying drawings, in which:

FIG. 3 illustrates an exemplary screenshot of a webpage showing a list of channels owned by a user and a list of channels the user is subscribing to;

FIG. 5 illustrates an exemplary screenshot of a webpage showing a set of criteria for searching for content to be added to a channel program;

FIG. 7 illustrates an exemplary screenshot of a webpage showing the current program of a content channel, a set of selected content items, and a set of criteria for scheduling the streaming times of the selected content items into the channel;

FIG. 8 illustrates an exemplary screenshot of a webpage showing an updated/extended channel program.

DETAILED DESCRIPTION

First of all, unless it is clearly stated otherwise, it must be noted that the singular forms "the", "a", "an", and "it", and the plural form "they", as used herein, in the appended claims, and in the title, include plural references and singular references, respectively. In addition, it is to be understood that all technical and scientific terms, used herein and in the appended claims, are used for the purpose of describing the particular embodiments only, and are not intended to define or limit the scope of the present invention. It is also to be understood that the terminology, used in the description, has the same meanings as commonly understood by one of ordinary skill in the art.

The following will describe in detail the present invention with reference to one or more methods and embodiments thereof, as illustrated in the accompanying drawings. It must be noted that the description of the particular methods and embodiments is not intended to define and/or limit the scope of the present invention to the described embodiments. Indeed, it will be apparent, to one skilled in the art, that any alternative, modification, method and embodiment, within the spirit and scope of the present invention as defined by the appended claims and similar or equivalent to the particular methods and embodiments described herein, can be also used in practice and testing of the present invention. It will be also apparent to one skilled in the art that the present invention may be practiced without some or all of the described details. It must be further understood that the scope of the present invention is not limited to the particular methodologies, systems and materials described herein either.

Figure 1:
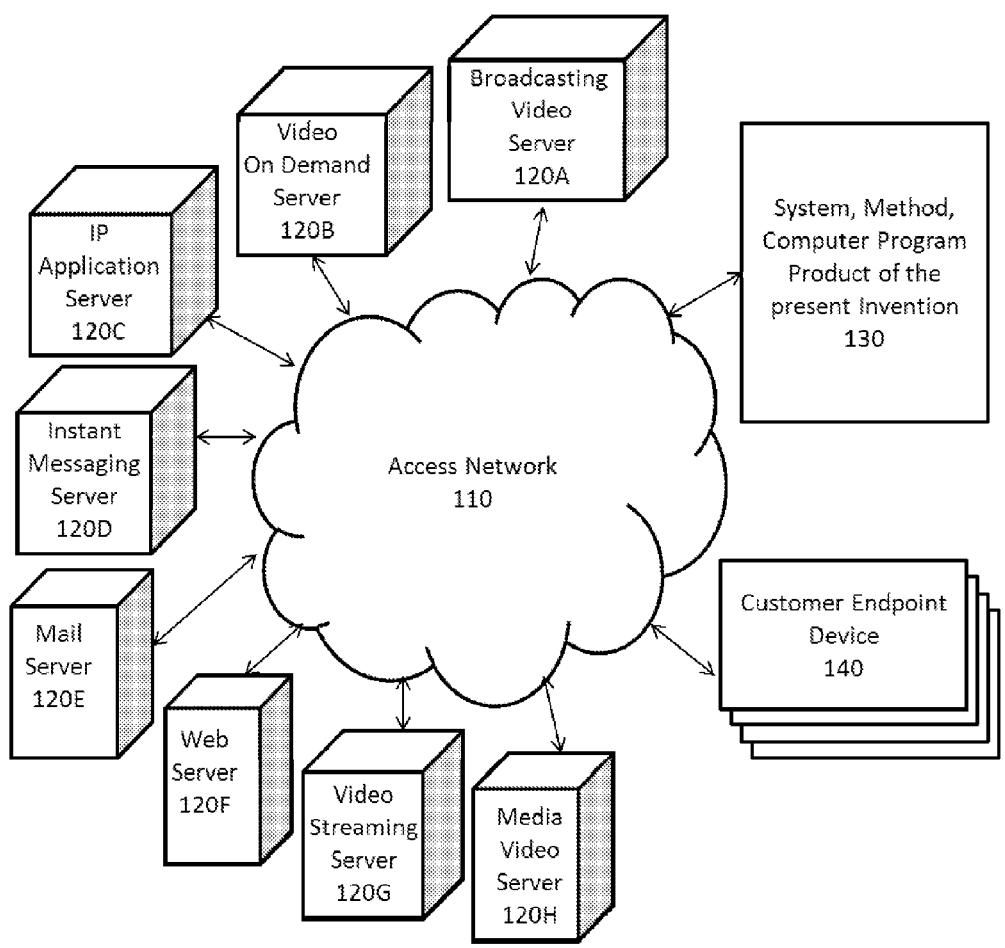
FIG. 1 illustrates an exemplary communications system related to the present invention.

Referring now to the drawings and particularly to FIG. 1, a general diagram of a communications system, related to the present invention, is illustrated therein. It must be noted that the present invention should not be interpreted to be limited by this particular illustrative architecture shown in FIG. 1. The communications system shown in FIG. 1 comprises a plurality of customer endpoint devices 140 and a plurality of servers 120A-120H. The customer endpoint devices 140 and the servers 120A-120H are interconnected by an access network 110.

The system, method, and computer program product 130 described in the present invention is also a part of the communications system, related to the present invention, as shown in FIG. 1. As will be detailed later, the system, method, and computer program product 130 consist of a number of databases and modules with specific functions. The databases and modules of the system, method, and computer program product 130 may be separately stored/implemented in different machines or at the same machine. They may be also stored/implemented in a machine where content is available (e.g., servers 120A-120H or customer endpoint devices 140). They may be also located on a machine different than the content servers 120A-120H and the customer endpoint devices 140.

The access network 110 may be packet-switch based or circuit-switch based. It may be a local area network, a wide area network, a metropolitan area network, a cable network, a mobile network, a wireless network, a femto network, an ad-hoc network, an intranet, a corporate network, the Internet, a combination of some of these networks, and the like. Depending on the type of the underlying access network, the access network 110 may be supported by networking components such as gateways, routers, switches, hubs, and so forth. Exemplary packet-switch based networks include, but not limited to, Internet Protocol (IP) networks, frame-relay networks, Asynchronous Transfer Mode (ATM) networks, and the like. They use, but are not limited to, cable broadband, fiber optic, IP, ATM, Ethernet, frame relay, or digital subscriber line technologies. They support multi-service applications including, but not limited to, video, data, and voice services. The access network 110 interconnects the various processing devices, such as the servers 120A-120H and the customer endpoint devices 140. Communications between the different processing devices follow a specific communication protocol and may be either in real time or otherwise.

Hereunder, the present invention is discussed wherein the access network 110 is an IP network and the World Wide Web (WWW) and the relevant HyperText Transfer Protocol (HTTP) are protocols for enabling communication between the different processing devices. However, it is to be understood that IP, WWW, and HTTP are chosen by a way of example and not by way of limitation to the scope of the present invention. Other types of access networks and protocols may also be employed.

Customer endpoint devices 140 may be any device capable of processing content information, interacting with a corresponding content stream, and communicating over the network. They may be further capable of supporting various operations, such as and not limited to, content viewing, content recording, content play, content forwarding/rewinding, content downloading, content uploading, etc. Typical customer endpoint devices 140 include, but are not limited to, desktop computers, notebook computers, cellular network devices such as a smart phone, tablets, pervasive computing devices such as a personal data assistant (PDA), network-capable digital cameras, network-capable digital photo frames, network-capable media players, audio/video devices such as network-capable DVD players, Blu-Ray Disk players, audio/video recording devices, network-capable storage devices, plasma TV sets, liquid crystal display TV sets, high definition TV sets, video player/recorder, TV set top boxes, network-capable home appliances, and network-capable game devices such as Nintendo WII, Sony Playstation, Microsoft XBOX Live, Microsoft XBOX 360, etc.

The communications system illustrated in FIG. 1, may comprise one or more servers 120A-120H. These one or more servers may be located in the same location or distributed over a wide geographical area. They may also form a cloud of servers, located at a single data center or at a distributed network of data centers. They may also form a peer to peer network. They may be owned and operated by the same administrator/provider or by different ones. These servers 120A-120H include, and are not limited to, video-on-demand media servers, broadcast video servers, video conferencing servers, video streaming servers, gaming servers, web servers, HTTP servers, electronic mail servers, IP-based application servers, instant messaging servers, voice over IP servers, news feeds servers, story feeds servers, gaming servers, picture storage servers, user-contributed service/application servers, etc. Depending on the provided service, these servers 120A-120H may stream content, in the same or different formats, to customer endpoint devices 140 using the same or different data delivery protocols, the same or different data compression techniques, the same or different streaming rate adaptation technologies, and so forth. Some of these servers may be accessed either in a push or pull mode, and may then require necessary passwords, credentials, access permissions, and other security settings. In one embodiment of the present invention, with appropriate settings a customer endpoint device 140 may also function as a server providing other customer endpoint devices 140 with content. Interactions of a user with a server include, and are not limited to, content creation, content edition, content upload, content download, content search, content deletion, personal data input, service reception, interactive data transfer, etc. By way of example, and not by way of limitation, a server 120A-120H may employ a user interface, such as and not limited to, a web portal or a web page, that is accessible by a user. The user may use the user interface to comment on a content provided by the server, to edit/update information regarding a content available at the server, to download a content from the server, to upload a content to the server, to remove a content from the server, to extract information regarding a content at the server, to search for/retrieve a content at the server, to evaluate/categorize/order/rate a content at the server, to post on the server, etc.

Although the present invention has been described using video content, it must be reiterated that content has a broader meaning in the present invention. Indeed, embodiments are foreseen wherein the system, method, and computer program product 130 described herein are applied to a plurality of content type, such as and not limited to, audio files, images, games, news feeds, story feeds, blogs, electronic books including machine-readable books, etc.

Content may be available at different sources and in different formats. For example, digital images may be in a format of JPEG, GIF, PNG, etc. Audio content may be in a format of MP3, WAV, WMA, etc. Video content may be in a format of MPEGx, H.264, AVS, AVI, etc. A content item may be entirely available at the same endpoint device or distributed among two or more endpoint devices. For example, a portion of a content item may be available at a particular server 120A-120H and the remaining portion of the content available at a different server. Content can be also distributed at different customer endpoint devices 140, as in the case of general peer to peer networks. It may be also obtained live and streamed in real time. Video content may be obtained from, for instance and not limited to, live event broadcasters/streamers, cable and satellite TV broadcasters, video rental companies, and video on demand providers such as Netflix, Huluplus, and Blockbuster. Video content may be contributed by users from all over the world and available at online sites such as Youtube, Vimeo, and Dailymotion, or available at private/self-managed servers. Content may be also available at proxies, caches, servers, and at internal or external storages of customer endpoint devices 140. Content may be also available at content distribution networks, such as Akamai. In the present invention, the term "content" shall be construed as applying to any of the above mentioned multimedia types and shall not be limited to any particular media type unless explicitly so stated.

In general, a social network is a community of people having one or more interests/activities in common. According to one aspect of the present invention, a social network is a community of users having interest in, by way of example and without limitation, at least one feature of a content channel, a content streamed by the channel, the owner of the content channel, at least one member of the social network of the content channel, etc. This interest could be permanent or just for a short term. This type of social network is referred to as a channel social network. According to a second aspect of the present invention, a social network is a community of users having at least one interest in common with a particular user. This type of social network is referred to as an individual social network. Both an individual social network and a channel social network may be an internal social network, restricted to a closed/private community of users, or an external social network, partially or fully public and open to all users or a wider set of users, who are not necessarily members of the social network.

In one embodiment of the present invention, a channel social network and an individual social network can be further organized in directories of some categories such as, by way of example and without limitation, family, friends, work colleagues, classmates, etc. Both a channel social network and an individual social network may be populated either based on automatic recommendation by the system, method, and computer program product 130 described herein, by having users inviting, by way of example and without limitation, friends, colleagues, family members, etc, to join their associated social networks, or both. In one embodiment of the present invention, a user may invite another user to a social network using, by way of example and without limitation, a list of at least one email address; one or more existing social network platforms/applications such as Facebook, Twitter, LinkedIn, Google Plus, MyYearBook, Hi5, Mixi, etc; one or more instant messaging applications and services such as AOL, Google Gtalk, MSN Messenger, Yahoo Messenger, ICQ, etc; one or more electronic mail applications such as Microsoft Outlook, Mozilla Thunderbird, Hotmail, Gmail, etc; one or more voice over IP applications such as Skype; one or more online gaming applications; one or more online discussion groups and blogging forums; etc.

In the present invention, the social network of the system, method, and computer program product 130 described herein is the ensemble of the existing channel social networks and the individual social networks.

Figure 2:
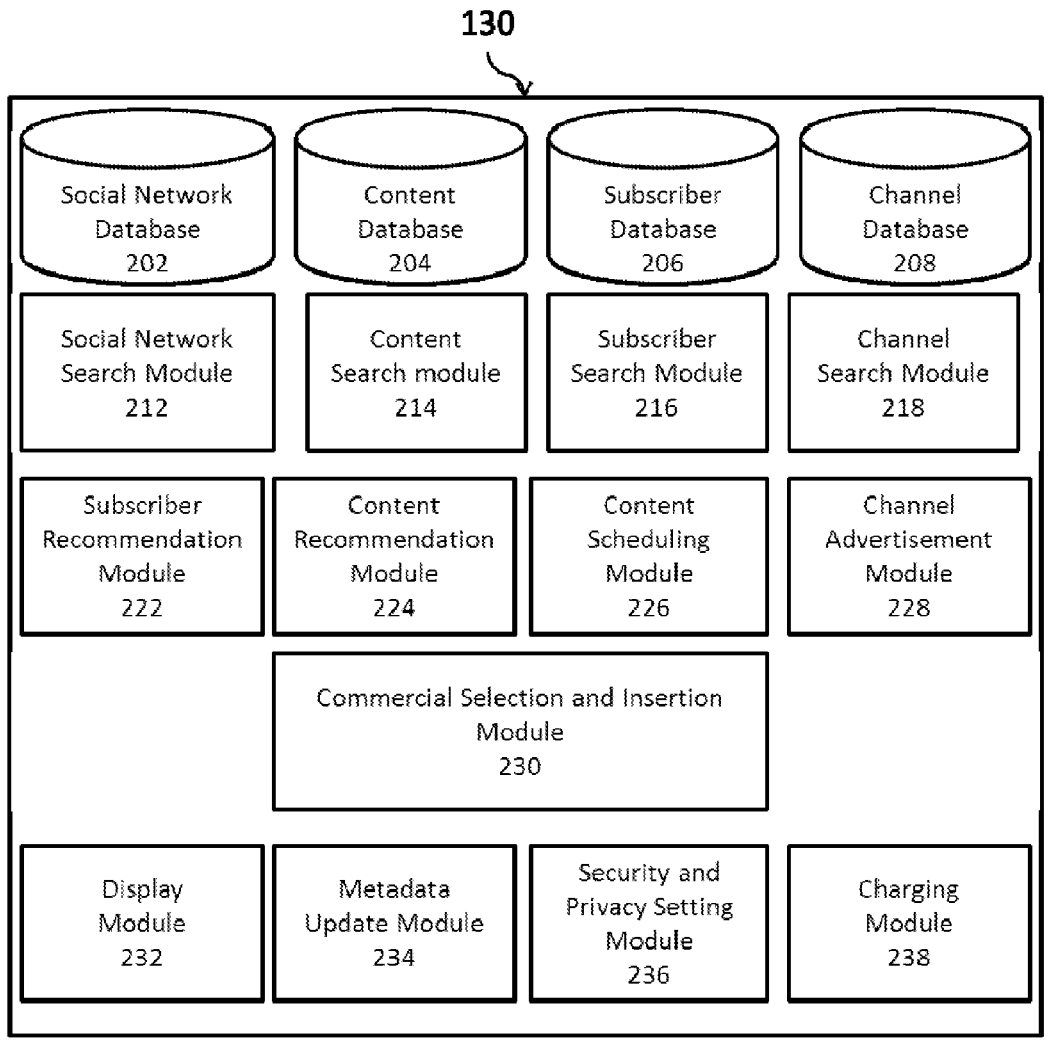
FIG. 2 illustrates a high-level block diagram of the system, method and computer program product described in the present invention.

FIG. 2 schematically depicts the system, method, and computer program product 130 described herein. It consists of a number of databases and modules with specific functions. These databases/modules may be separately stored/implemented in different machines or at the same machine. They may be also stored/implemented in a machine where content is available (e.g., servers 120A-120H or customer endpoint devices 140). They may also be located on a machine different than the content servers 120A-120H and the customer endpoint devices 140. It shall be understood that the system, method and computer program product 130 described herein may be practiced with only some of the shown modules and databases.

In FIG. 2, four main databases are shown. While FIG. 2 illustrates four independent databases, they may be configured differently, including as one single database. One of the databases shown in FIG. 2 may be also split into more than one database. The four databases shown in FIG. 2 are namely the subscribers' database 206, the channels' database 208, the social networks' database 202, and the content database 204. In one embodiment of this invention, the content database 204 may be locally stored at the premises of the administrator of the system, method, computer program product 130 described herein and content providers may be provided with one or more suitable interfaces to input information/metadata regarding their content in the content database 204. In another embodiment of the present invention, the content database 204 may be hosted at the content provider's premises and the system, method, computer program product 130 described herein, may interface to the content database 204 to access information regarding content. Thus, although FIG. 2 shows all of these components within a single system 130, the components may be physically distributed across multiple computers.

FIG. 2 also depicts four search modules, namely content search module 214, subscriber search module 216, channel search module 218, and social network search module 212. These modules are used to search for a particular item in the relevant database using one or more suitable search methods.

The subscriber database 206 contains different information regarding a user. According to exemplary embodiments, subscriber information comprise a user's credentials such as, and not limited to, a user name, password, email address, subscriber type (e.g., channel owner, ordinary subscriber, or both), profile photo, profile type (e.g., public/external or internal/restricted to a specific community of users), and other privacy/security settings. Subscriber information may also include, and not limited to, a user's first name, family name, gender, age, address, country, spoken languages, job type, employer, schools, affiliations, etc. Subscriber database 206 may also include information regarding specific interests of a user, such as and not limited to, favorite directors, favorite actors, favorite video types, favorite sport shows, favorite documentary types, a list of videos the user explicitly showed interest in and/or may be interested in, time at which the user usually watches TV, time at which the user usually watches movies, time at which the user usually watches news, etc. Subscriber database 206 may also include the list of channels a user owns, the list of channels the user is subscribing to, the list of social networks the user owns, and the list of social networks the user is a member of. In one embodiment of the present invention, there may be a limit on the number of channels a user may own and/or subscribe to. Other information available at subscriber database 206 may be views of other users on a given user, incentives the user gained, charges, and list of most recently added friends. Other information available at the subscriber database 206 could be last login time of a user, last login location, list of people who viewed the profile of the user during a specific period of time, list of people who commented on the user profile, list of people who liked/showed interest in the user profile, etc. Other information that may be available at the subscriber database 206 may be URLs of a user's photo albums, list of favorites of the user, maximum number of channels the user may own, maximum number of channels the user may subscribe to, list of other users requesting subscription to one of the user's own channels, list of other users requesting subscription to the user's social network, pending invitations from other users inviting the user to join their channels, pending invitations from other users inviting the user to join their individual social networks, etc. In one embodiment of the present invention, a user may accept, reject, or ignore a channel join request and/or a channel join invitation. In a further embodiment, when a user rejects a channel join request and/or a channel join invitation, the user may block the request/invitation issuing user.

Some of the data in the subscriber database 206 may be acquired by the system, method, and computer program product 130 described herein using one or more suitable methods. By way of illustration and not by way of limitation, the system, method, and computer program product 130 described herein may employ a user interface, via a web page or web portal, that is accessible by a user to manually enter the data, e.g., videos the user is interested in, time at which the user usually watches TV, etc. As another example, the system, method, and computer program product 130 described herein may learn about users and their preferences using one or more suitable learning tools by studying their behavior, the behavior of a group of their social network members, and the behavior of users with similar tendencies, not necessarily members of their social networks.

The content database 204 contains different information regarding content. According to exemplary embodiments, content information comprise content identifier, content title/name, content type (e.g., video, image, audio, story feeds, etc), content description, relevant keywords for content search, list of actors, director, producer, distributor name, content genre (e.g., in case of videos; action, horror, family, romance, animation, comedy, cooking, education, news, fashion, fitness, health; in case of music; classic, pop, jazz, folk, etc). According to another embodiment, content information at content database 204 indicate whether content is a user-created content or owned and provided by a reliable content provider. Content reliability and availability could be assessed based on the source/provider of the content, history of the content provider in providing the server, etc. Indeed, content provided by a reliable content provider is deemed to be most likely always available, whereas content at on an online site such as Youtube or Dailymotion could become unavailable at any time. According to exemplary embodiments, content information can also comprise the language of the content, the location of server, URLs, thumbnail, caption (image), trailer, playback duration in case of video and audio content, content size, year of production, encoder type, encoding rate, encoding setting, price of the content (e.g., for free or not). According to another aspect, content information also include user views on the content, user rating, information on age restriction (e.g., not for users younger than a specific age), information on broadcast area restriction (e.g., only in North America), the number of times a content can be streamed in a specific location and during a specific period of time, and information on viewer restriction (e.g., not recommended for pregnant female users).

Content information may also include a metadata of markers to be used for deciding what commercials or advertisements to insert within the content stream and the associated insertion position within the content stream. Content information may also indicate whether it is possible to have commercials inserted during the content playback or at the end of the content playback. Content information may also include statistical information such as, and not limited to, a list of users who viewed the content during a specific period of time (e.g., today, this week, etc), a list of users who commented on the content during a specific period of time, a list of users who explicitly showed interest in the content, etc.

According to an exemplary embodiment, the content database 204 may contain a sub-database of commercial or advertisement content. For commercial content, in addition to the above mentioned content information, statistical information may include a list of channels on which the commercial was streamed, the frequency at which the commercial was streamed at each channel, a list of time instances at which it was streamed on a particular channel, the number and list of users that actually viewed the commercial and that is during a specific period of time (e.g., day, week, month), etc. It should be noted that commercials could be inserted within a content stream, at the end of a content stream, or as a hyperlinked text or image displayed on the customer endpoint device 140.

The channel database 208 contains different information regarding channels. According to exemplary embodiments, channel information comprise, and not limited to, channel identifier, channel type (e.g., commercial, private, non-profitable, etc), channel logo, channel owner, channel description, channel program (e.g., today, this week, this month, etc), etc. Channel information also comprise information on its social network, such as and not limited to, social network identifier, social network mailing list, social network size, list of social network members and their features, etc. According to a further embodiment, channel information comprise metrics and rules for content recommendation and content scheduling, such as, by way of illustration and not by way of limitation, recommendation based on content type (e.g., only movies, movies and news, music video clips, only news, only user created content, only reliable content, etc), recommendation based on server proximity (e.g., only content available in servers located within a specific country), recommendation based on preferences of the majority of the social network members, recommendation based on content popularity, recommendation based on information from a specific source (e.g., Youtube's standard feeds, etc), recommendation based on broadcast restriction (e.g., only content viewable in Europe), recommendation based on age restriction (e.g., only content viewable by users older than a specific age, etc), etc. Depending on the content type (e.g. image, story feeds, etc), channel information may comprise streaming periodicity of content (e.g., a new image is streamed every one minute; the streaming periodicity is then one minute). According to a further embodiment, channel information comprise different statistical information such as, and not limited to, list of user views, list of user comments, user ratings, last date/time at which the channel program was scheduled, list of users who viewed the channel during a specific period of time (e.g., today), list of users who commented on the channel during a specific period of time (e.g., today), list of users who subscribed to the channel during a specific period of time (e.g., today, recently subscribed users), timeline growth of the channel subscribers, etc. According to a further embodiment, channel information may indicate whether a channel accepts having commercials inserted during the stream of a single content item in the channel, only after the end of the stream of a content item, as a hyperlinked text or image displayed on the screen of the customer endpoint devices 140 during the channel stream. According to a further embodiment, channel information may also comprise a list of users requesting subscription to a channel and a list of pending invitations from the owner of a channel to other users to subscribe to the channel.

The social network database 202 contains different information regarding existing social networks. It should be noted that subscribers to a channel form the social network of the channel. Similarly, the community of users having one or more interests in common with a particular user forms the individual social network of the user. The aggregate of the existing channel and individual social networks form the social network of the system, method, and computer program product 130 described herein. According to exemplary embodiments, information regarding a social network comprise, and not limited to, social network name and/or identifier, serving channel name, name and/or identifier of the social network owner, social network description, social network mailing list, social network type (e.g., commercial, non profitable, friends & family, international, only members speaking a particular language, only members residing in a particular geographical area, only members with some age requirements, only children, etc), a list of the subscribed social network members, etc. According to a further embodiment, social network information may comprise statistical information regarding a social network, such as and not limited to, user views, user comments, user rating, a list of users who viewed the social network during a specific period of time (e.g., today), a list of users who commented on the social network during a specific period of time (e.g., today), a list of users who joined the social network during a specific period of time (e.g., today, recently added members), timeline growth of the social network members, etc. According to a further embodiment, social network information may also comprise a list of users requesting joining a social network and a list of pending invitations from the owner of the social network to other users to join the social network.

In a preferred embodiment of the invention, the system, method, and computer program product 130 may also comprise an instant messaging service to enable chat rooms among users, mail service for the delivery of electronic mails among the users, and video conferencing service to enable video conferencing among users.

The system, method, and computer program product 130 described herein comprise a number of modules, each with a particular role, as shown in FIG. 2. These modules can be either functions within the computer program product described herein, sub-methods of the method described herein, and/or elements of the system described herein.

The module for social network search 212 enables a user to query the social network database 202 for a social network using one or a list of search criteria (e.g., social network identifier, social network owner name/ID, specific keywords in the social network description, social networks a particular user is joining, most popular social network, most active social network, largest social network, social network mailing list, etc). In response to the query, the social network search module 212 provides results of the search in terms of a list of one or more social networks that match the search criteria.

The module for content search 214 enables a user to query the content database 204 for content using one or a list of search criteria. According to exemplary embodiments, content search criteria could be based on the content source (e.g., online sites such as Youtube, Daily motion, content uploaded by a particular user, content available at reliable content providers, etc). In a further embodiment, a user can further tune the content search, for example and not limited to, by specifying the minimum and/or maximum size of the content, by specifying the minimum and/or maximum video duration, by specifying the minimum and/or maximum price of a content, by specifying a range for the year of production of the content, by specifying the content ID, content title, and/or content description; by specifying search keywords to be retrieved in any of the content metadata available at the content database 204, by excluding content that was viewed during a specific period of time (e.g., only content not streamed in the last two weeks), by specifying the language of the content, by specifying the server location of the content, by specifying a location radius that indicates the proximity of content servers to the current geographical location of the user or to the current geographical location of another set of users, by specifying a range for the publication time of the content, by specifying the content type, by specifying a minimum and/or maximum value for the user rating of the content and/or the content popularity, etc.

The module for channel search 218 enables a user to query the channel database 208 for a channel or a list of channels using one or more search criteria. According to exemplary embodiments, channel search criteria could be by specifying the channel type, by specifying the name/identifier of a user and searching for channels owned by the user, by specifying the name/identifier of a user and searching for channels the user is subscribing to, by specifying the name/identifier of the social network associated with the channel, by specifying one or more keywords to be retrieved in the channel metadata, by specifying the size of the social network of the channel, etc.

The module for subscriber search 216 enables a user to query the subscriber database 206 for a user or a group of users using one or more search criteria (e.g., users residing in a specific region, users speaking a specific language, users with specific age condition, user ID/name, users with particular interests in a channel type and/or a content type, users being currently online, users joining a particular social network, etc). In response to the query, the subscriber search module 216 provides results of the search in terms of a list of users that match the search criteria.

The module for subscriber recommendation 222 recommends users based on a set of rules. The rules in the subscriber recommendation module 222 may be characterized in any practical manner. In one embodiment of the present invention, subscriber recommendation is for a user interested in populating his/her individual social network. Subscriber recommendation may be then based, by way of illustration and not by way of limitation, on connections of existing members of the user's social network, on users who commented/viewed the social network during a specific period of time, on users who like/bookmarked the user's social network, on users having specific interest in common with the user, etc. In another embodiment of the invention, subscriber recommendation is for a user who wants to create a channel for the first time or for a user who already owns a channel and is interested in populating its social network. Subscriber recommendation may be then based, by way of illustration and not by way of limitation, on the individual social network of the user, the channel type, on users that explicitly indicated interest in at least one content streamed or to be streamed by the channel, on connections of existing members of the channel's social network, on users who commented/viewed the channel during a specific period of time, on users who like/bookmarked the channel, on users having specific interest in common with the channel owner, etc.

The channel advertisement module 228 recommends channels based on a set of rules. These rules may be characterized in any practical manner. In one embodiment of the present invention, the channel advertisement module 228 recommends to a content provider one or more channels whose owners may be interested in their content. In another embodiment of the invention, the channel advertisement module 228 recommends to a user one or more channels the user may be interested in subscribing to. Channel advertisement for a content provider may be based on channel information available at the channel database 208. Channel advertisement for a content provider may be further based on the preferences of members of the social networks of channels, etc. For example, if members of the social network of a particular channel are interested in a given content, channel advertisement module 228 recommends the channel to the content provider of the content. Channel advertisement for a user may be based, by way of illustration and not by way of limitation, on an explicit indication from the user, the content type the user has been viewing during a specific period of time, the channels the user is already subscribing to, the individual social network of the user, etc. For example, the channel advertisement module 228 may recommend/advertise action movie channels to a user who has been watching action movies for the last month. In another example, the channel advertisement module 228 may recommend/advertise a channel to a user if many friends of the user have subscribed to the channel.

The content recommendation module 224 recommends content to channel owners based on a set of rules. These rules may be characterized in any practical manner. In one embodiment of the present invention, content recommendation is carried out when a user desires to create a channel for the first time. In another embodiment of the invention, content recommendation is carried out to update and/or to extend the program of an existing channel. According to exemplary embodiments, content recommendation can be based on, and not limited to, the channel type, the social network of the channel and the preferences of its members, the previous program of the channel, preferences of the channel owner, etc. For example, the content recommendation module 224 recommends only children programs for a channel dedicated for children. In another example, if the majority of the members of the social network of a channel show explicit interest in a particular content, the content recommendation module 224 recommends that content for the channel. The content recommendation module 224 also takes into account the content source (e.g., online sites such as Youtube, Daily motion, content uploaded by a particular user, content available at reliable content providers, etc); i.e., if a channel owner seeks for content from only specific sources, the content recommendation module 224 recommends only content available at the specified sources. Other metrics that could refine the content recommendation procedure include, and not limited to, the content size, the video duration, the content price, the year of production of the content, the content language, the content caching location, the publication time of the content, the content popularity over a time interval (e.g., today, this week, this month, etc), the user rating of content over a time interval (e.g., today, this week, this month), etc. In an embodiment of the present invention, a channel owner may seek for content recommendation excluding content that was streamed into the channel during a specific period of time (e.g., only content never streamed in the last six months).

Once the content is recommended, and some or all of the recommended content are selected, the content scheduling module 226 then schedules the streaming times of the selected content based on a set of rules. These rules may be characterized in any practical manner. According to exemplary embodiments, content scheduling for a channel can be based on, and not limited to, the type of the selected content, content popularity, preferences of the channel owner, preferences of the channel's social network members, previous programs of the channel, etc. For example, if many members of a social network of a channel indicate that they prefer watching movies after 9 pm, the content scheduling module 226 schedules movies after 9 pm. In another example, if previous programs of a channel indicate that news programs are usually scheduled between 7:00 am and 7:30 am, the content scheduling module 226 schedules news programs during this time slot. In another example, if information regarding a channel and available at the channel database 208 indicate that the channel is viewed by the highest number of viewers between 8:00 pm and 10:00 pm, the content scheduling module 226 schedules popular content during this prime time, i.e., 8:00 pm-10:00 pm.

The commercial selection and insertion module 230 selects adequate commercials, also known as advertisements, and inserts them within a channel stream as appropriate according to a set of rules. These rules may be characterized in any practical manner. In one embodiment of the present invention, commercial selection and insertion within a channel stream is carried out during the content scheduling operation for the channel and before its final confirmation by the channel owner. In another embodiment of the present invention, commercial selection and insertion within a channel stream is carried out after the content scheduling operation is resumed. In a further embodiment of this invention, the commercial selection and insertion module 230 may enforce restrictions on the number and types of commercials to be inserted in a consecutive manner within the stream of a channel.

Commercial selection and insertion within a channel stream relies on, and not limited to, the metadata of markers of the content selected for the channel, the preferences of members of the channel social network, and the kind of the channel; i.e., whether the channel accepts having commercials inserted during the stream of a single content item in the channel, only after the end of the stream of a content item, as a hyperlinked text or image displayed on the screen of the customer endpoint devices 140 during the channel stream, etc. Markers of a content item may designate the commercial insertion position within the content stream and provide keywords relevant to the scene shown at the associated commercial insertion position. For example, if a selected content has a marker designating the $N^{th}$ frame and the scene at the $N^{th}$ frame is about two people drinking coffee, the commercial selection and insertion module 230 selects a commercial regarding coffee machines and inserts it right after the display of the $N^{th}$ frame at the customer endpoint device 140. In one embodiment of the invention, the selected commercials are inserted within a channel stream and enforced on the channel owner; in other words, the channel owner cannot change the set of selected commercials nor their streaming times into the channel stream. In another embodiment of the present invention, a channel owner has the flexibility to delete or replace some selected commercials and/or reposition them within the channel program.

In one embodiment of the present invention, the content recommendation module 224, the content scheduling module 226, and the commercial selection and insertion module 230 may base their operations on explicit indications from users stating their interest in particular content items, users' preferred time of viewing the content, and may further consider the preferences of users' connections from users' individual social networks and other social networks (e.g. Facebook, LinkedIn, etc). In addition to users' preferences, content scheduling may be also done in a way that a particular content can be simultaneously streamed to many subscribers of different channels located in a nearby geographical area. By way of illustration and not by way of limitation, suppose a content item A is scheduled to be streamed from time t1 to N subscribers of M different channels located in a particular Location L. When a channel owner, with many members in his/her channel social network residing in the same location L, desires to stream the same content item A, the content scheduling module 226 may recommend to the channel owner to schedule the content item A at time t1.

In another embodiment of this invention, the content recommendation module 224 and the content scheduling module 226 may consider restrictions about the streaming of particular contents, for example and not limited to, restrictions on the number of times a content can be streamed in a specific location and during a specific period of time, the specific locations where a content is allowed to be streamed, etc.

The content scheduling module 226 and the commercial selection and insertion module 230 take into account the playback duration of a content item in the scheduling operation to ensure smooth stream of content into a channel. In one embodiment of the invention, once the operations of the content scheduling module 226 and the commercial selection and insertion module 230 are completed for a channel, the channel owner still has the flexibility to manually alter and shuffle the recommended content list and the recommended content streaming schedule as appropriate. In another embodiment of the invention, once the operations of the content scheduling module 226 and the commercial selection and insertion module 230 are completed for a channel and the new program of the channel is confirmed by the channel owner, members of the channel social network may be notified with the channel program update; e.g., by having a notification message sent to the mailing list of the channel social network.

Once the program of a channel (i.e., the content list and the content streaming schedule) is decided, the system, method, and the computer program product 130 described herein notify the concerned content providers to stream the content as scheduled. In one aspect of this embodiment, the system, method, and the computer program product 130 described herein provide insights to the content providers on how and where to deploy/cache their content in an efficient manner. For example, if a content item A is scheduled to be streamed during a specific time interval and a high number of users, residing in the same area, are expected to view the content, the content provider may be advised to cache the content item A at a cache/server geographically and/or topologically closer to the residence area of the users. In another aspect of this embodiment, during content scheduling and content recommendation, the system, method, and the computer program product 130 described herein may take feedback from the content providers regarding when and where content will be cached into account. For example, if a content provider plans to cache a set of content items at a server in location L during a specific time interval, the content recommendation module 224 and the content scheduling module 226 may prioritize this set of content items for channels with a high number of subscribers residing in the vicinity of location L.

In another embodiment of the present invention, upon its update, a channel program is forwarded to the members of the channel social network, and stored locally at their respective customer endpoint devices 140. Content is then delivered to a customer endpoint device 140 according to the channel schedule when the relevant user joins the service, i.e., signs in and gets online. In a further embodiment, the system, method, and computer program product 130 described herein provides customer endpoint devices 140 with credentials for accessing/receiving content from the servers of relevant content providers. These credentials may be unique for each user, e.g., a hash function of the user's identifier. Furthermore, they may be encrypted using an encryption key known only to the user (e.g., user's password).

In one embodiment of the present invention, content is streamed in real time from relevant servers 120A-120H to customer endpoint devices 140 of members of a channel social network according to the channel schedule. In another embodiment of the present invention, content is fully or partially streamed, sometime before the scheduled time, from relevant servers 120A-120H to customer endpoint devices 140 of members of a channel social network and stored locally at the customer endpoint devices 140 for later playback according to the channel schedule.

Depending on the content source (e.g., online video content provider such as Youtube), a content, scheduled to be streamed into a channel, may become unavailable. In one embodiment of the present invention, availability of a content item may be verified by the system, method, and computer program product 130 described herein, some time before the scheduled playback time of the content item. In case a content item, scheduled to be streamed into a channel, becomes unavailable, in one embodiment of the present invention, a notification alert may be issued to the channel owner and/or to the mailing list of the channel social network. In another aspect of the embodiment, a replacement to the missing content item may be automatically decided by the content recommendation module 224. In another embodiment, the channel owner may manually decide a replacement following the notification alert message.

The display module 232 is in charge of the presentation form, style and design of a reply to a query from a user. In an exemplary embodiment of the present invention, if a user desires to view his/her profile or the profile of another user, the display module 232 shows values of different entries, regarding the profile, available at the subscriber database 206. The profile is shown while taking into account the associated security and privacy settings and according to the form, style and design dedicated for the presentation of user profiles. In another exemplary embodiment of the invention, if a user desires to view the program of a particular channel, the display module 232 presents the program channel according to a predetermined form, style and design, showing, for example and not limited to, the channel ID, the channel social network ID, the program of today, this week, or this month, etc. In a further exemplary embodiment of the invention, if a user desires to view the list of channels he/she is subscribing to and/or owning, the display module 232 presents the requested list of channels according to a predetermined form, style and design, showing, for example and not limited to, the user ID, the channel IDs of the list of channels the user is subscribing to and owning, etc. The list of channels may be ordered following different metrics, such as in alphabetical order, according to the user's preferences, the size of the channel social networks, the channel popularity, the channel revenues, etc. In a further exemplary embodiment, if a user desires to search for content, the display module 232 shows the search results according to a predetermined form, style and design, showing, for example and not limited to, the list of retrieved content that match the search criteria, along with content ID, content description, content publication time, content genre, content language, etc. In one aspect of the embodiment, only a limited number of items from the retrieved content could be displayed per page. In another aspect of the embodiment, the displayed content could be categorized in different groups, e.g., per content source. In a further aspect of the embodiment, the displayed content could be ordered by user rating, user views, publication time, explicit preferences of the user, etc.

The metadata update module 234 enables a user to create, delete, add, edit and update information regarding, and not limited to, the user's profile, the user's social network, the users' owned channels and their respective social networks, the user's generated content, etc. Functions available at the metadata update module 234 include, and not limited to, metadata creation, deletion, addition, ordering, categorization, update, extraction, association, evaluation, enabling, disabling, rating, assigning, etc.

The charging module 238 is responsible for all charging and pricing operations, such as and not limited to, recent content purchases by a channel owner, transactions history, points/incentives gained by a user, lists of purchased content by a user, charges on users subscribing to paid channels, etc. Indeed, in one embodiment of this invention, a channel owner can be charged for all, a set of, or some types of content streamed within the channel, and that charge is determined based on the size of his/her social network, the objective of the channel, the channel type, etc. In another embodiment of this invention, the charging module 238 also charges commercials and advertisement providers for having their commercials inserted within channels and/or having their advertisements shown on web portals. In a further embodiment of this invention, the charging module 238 may charge a channel owner basic fare for the channel ownership (and that may be depending on the size of the channel social network, activity level of the subscribers, etc), may apply additional charges for the streaming of particular content types, for content recommendation service, for content scheduling service, for subscriber recommendation service, for consultation service in terms of how to develop further the channel and attract more subscribers, for the advertisement of the channel among all or a particular set of users, etc. In another embodiment of this invention, the charging module 238 may charge a user basic subscription fee for subscribing to a paid channel. In another exemplary embodiment of this invention, the charging module 238 may charge a content provider for guidance on content distribution/replication. Indeed, as demands for contents are scheduled a priori, the system, method, computer program product 130 described herein can provide guidance to content providers on how and where to distribute/cache their content, taking into account an expected number of interested users and their geographical distribution, so that network resources will be efficiently utilized and a prompt content streaming service can be ensured.

For charging purposes, the charging module 238 incorporates one or more charging mechanisms that may be based on, and not limited to, basic (monthly) subscription fee (i.e., for a channel owner, ordinary users subscribed to paid channels), may consider additional charges for the purchase of some content types (e.g., new popular movies), may consider discounts for early booking/scheduling of contents (i.e., the earlier a channel owner adds a content item to its channel program, the cheaper), etc. In an embodiment of the present invention, a channel owner may be charged for the owned channel and/or for some of the content streamed in the channel depending on, and not limited to, the channel type (e.g., family use only, commercial, non-profitable), the size of the social network of the channel, etc. In another embodiment of the present invention, an owner of a channel, exclusive for personal use, may be charged less or none for a paid content item he/she did not indeed view. In a further embodiment of the present invention, rebroadcasting/streaming the same content may be free of charge, but subject to some restrictions.

In the system, method, and computer program product 130 described herein, a user may gain incentives in return of a task carried out by the user. According to exemplary embodiments, a user may gain an incentive for, and not limited to, explicitly indicating interest in a particular content item, for inserting a commercial within the stream of a channel owned by the user, for inviting a new subscriber to join a particular channel, etc. In another aspect of the embodiment, the incentives gained by a user for inviting a new subscriber could depend on the activity level of the new subscriber, how many channels the new subscriber subscribes to, how often the new subscriber views the channels, whether the new subscriber created an own channel, etc.

In a further aspect of the embodiment, a channel owner may gain incentives in return of accepting content scheduling recommended by the content scheduling module 226. Indeed, in an embodiment of the present invention, content scheduling may be done in a way that a particular content can be simultaneously streamed to many subscribers to different channels located in a nearby geographical area. For example, suppose a video A is scheduled to be streamed at time t1 to N subscribers to M different channels located in Location L. When a channel owner, with many members in his/her channel social network residing in the same location L, desires to stream the same video A, the content scheduling module 226 may recommend to the channel owner to schedule Video A at time t1. If the channel owner accepts this scheduling recommendation, some incentives may be given to the channel owner. In a further embodiment of the present invention, the system, method, and computer program product 130 described herein may post in real time a message to users and the user who responds fastest to the message may gain incentives.

In another embodiment of the present invention, the charging module 238 may apply a penalty on a user as a consequence to a task carried out by the user. For example, the charging module 238 may apply a penalty on a channel owner for canceling or rescheduling the streaming of a content item some time before the actually planned playback time of the content within the channel. In one aspect of the embodiment, a penalty may depend on how far in advance the cancellation/content rescheduling request is made before the original scheduling time of the content, etc. In another aspect of the embodiment, there could be some restriction in time regarding when a channel owner can alter the streaming time of a content item into the channel. For example, a user may not be able to change the streaming time of a content item two hours before its originally scheduled streaming time.

In one embodiment of this invention, incentives gained by a user and/or penalties received by a user may vary as a function of, and not limited to, the size of the user's individual social network, the social network of a channel owned by the user, etc. In one aspect of the embodiment, incentives can be used by a user to purchase a paid content item to stream on any channel owned by the user.

In one embodiment of this invention, the charging module 238 may charge a commercial owner based on an accurate estimate of the number of users that viewed a commercial content. In an example of this embodiment, if the aggregate number of users that viewed a commercial during a specific time interval exceeds a pre-agreed threshold, the charging module may apply additional charges to the owner of the commercial.

The security and privacy setting module 236 is in charge of enforcing measures that, and not limited to, authenticate users, secure access to content at servers and databases, authorize and control channel viewing, ensure that channel owners do not violate copyrights when they upload content, ensure that, when required, users are not storing full content at their customer endpoint devices 140 to avoid redistribution of copyrighted content later, and protect the privacy of users by disclosing only what is allowed and only to whom it is allowed. The security and privacy setting module 236 may further apply mechanisms that validate the personal information subscribers provide and based on which the system, method, computer program product 130 described herein perform content recommendation and content scheduling, etc. In one embodiment of this invention, a user can either login or sign in for the first time. In case of a new sign up, the user provides information that builds his/her profile and get stored at the subscriber database 206. In one aspect of the embodiment, after signing in, a confirmation message may be sent to, e.g., the email address provided by the subscriber to authenticate the email address.

As an exemplary embodiment, the system, method, and computer program product 130 described herein enable a user to create a content channel and then build a social network dedicated for it. For this purpose, the user first needs to determine the type of the channel to create. As mentioned earlier, a channel can be a video channel in case of video content, a radio channel in case of audio content, an image channel in case of photos/images/pictures, etc. The user needs to specify further the kind of channel (e.g., personal, commercial, non profitable, etc) and the type of content to be streamed over the channel. In case of a video channel, content can be movies, music video clips, documentaries, news programs, combination of these, etc. The user needs then to determine the kind of social network to target. As mentioned before, a social network can be a "friends & family" social network, an "only family" social network, an "only children" social network, a social network of "only people living in a specific location", a social network of "only people speaking a specific language", etc. In another exemplary embodiment, the system, method, and computer program product 130 described herein enable a user to create a social network and then create a content channel dedicated for the social network, streaming content personalized/customized to the members of the social network by selecting content and scheduling the content playback time based on the up-to-date preferences and profiles of members of the social network.

Figure 3:
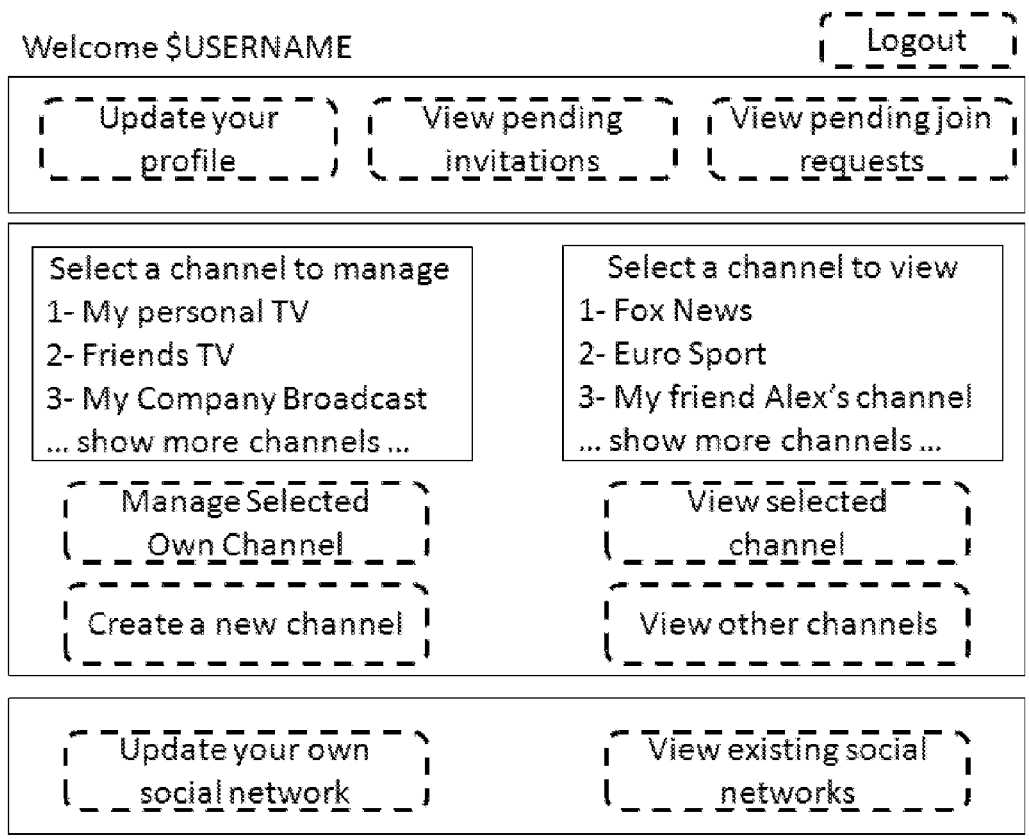

FIGS. 3-9 show exemplary screenshots of webpages that a user may use to set-up and manage a content channel. Initially a user either logs in (if he is an existing user) or signs in (if he is a new user) through the service's web portal. This service is typically hosted in a machine different from the customer endpoint device 140 and the content servers 120A-120H. All modules of the computer program 130 of the present invention may be resident on this machine. In other embodiments, only a subset of these modules of the computer program 130 may be resident on this machine. Other modules may be resident on servers 120A-120H and customer endpoint devices 140. After successful login, a user views on the display device of his customer endpoint device 140 the list of channels he owns and the list of channels he is subscribing to, as shown in FIG. 3. These two lists can be found from the subscriber database 206. Using the web page of FIG. 3, the user may update his profile accessible from the subscriber database 206 and using the metadata update module 234, may view pending invitations to the user to join other channels accessible from both the subscriber database 206 and the channel database 208, and may view the list of requests he received from other users interested in joining a channel owned by the user accessible from both the subscriber database 206 and the channel database 208. From the list of channels the user is subscribing to, the user may select a channel and view the channel content being currently played, view the social network of the channel, and view other details about the channel available at the channel database 208, etc. The user may use the same web page of FIG. 3 to search for and view other channels apart of those he is subscribing to using the channel search module 218, to create a new channel, to update his own social network, and to search and view other social networks using the social network search module 212.

Figure 4:
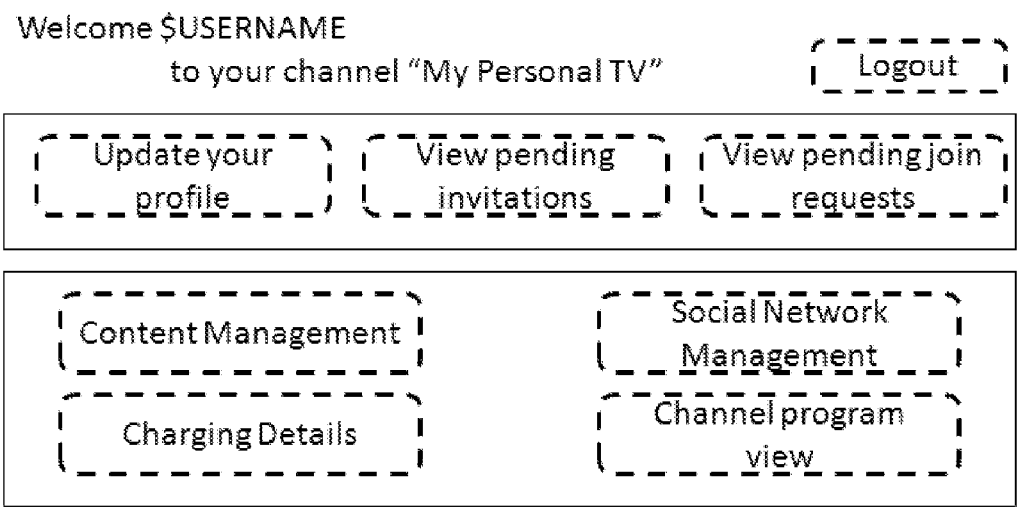
FIG. 4 illustrates an exemplary screenshot of a webpage showing the main operations for managing a particular channel owned by a particular user.

From the list of channels the user owns, the user may select one own channel to manage by clicking on the "manage selected own channel" button in FIG. 3. A new page as shown in FIG. 4 is then displayed on the customer endpoint device 140. In this new page of FIG. 4, the channel name is specified (in this example, "My Personal TV"). By clicking on the channel name in this webpage, details on the channel ID can be shown. Channel details are available at the channel database 208 and may include today's program of the channel, content being played now, the social network of the channel, description of the channel. On the webpage of FIG. 4, by clicking on the content management button, the user can select new content items, add them to the channel program, schedule their streaming times, and accordingly update/extend the existing channel program. By clicking on the "social network management" button, the user can invite new users to join the channel's social network, can remove some unwanted users from the channel's social network, etc. By clicking on the "charging details" button, recent transactions history, gained points, purchased content list, etc can be displayed. By clicking on the "channel program view" button, the user views the channel program on a different time scale (e.g., day, week, month, etc) using the display module 232.

For content management of the channel, the owner needs to first select suitable content for the channel. FIG. 5 shows an exemplary screenshot of a sample webpage for content search. Using the webpage of FIG. 5, the channel owner may specify the sources of the content items to be retrieved. The channel owner may further tune the search by specifying the minimum video duration, entering specific keywords, excluding content items that were streamed some specific period of time ago (e.g., last 10 weeks). The content search is carried out by the content search module 214. The channel owner may also get content recommended by the system, computer program product, and method of the present invention using the content recommendation module 224. The channel owner may also specify how many content items to display per page and how they should be ordered (e.g. by user rating, user views, etc). The determined values are used by the display module 232.

Figure 6:
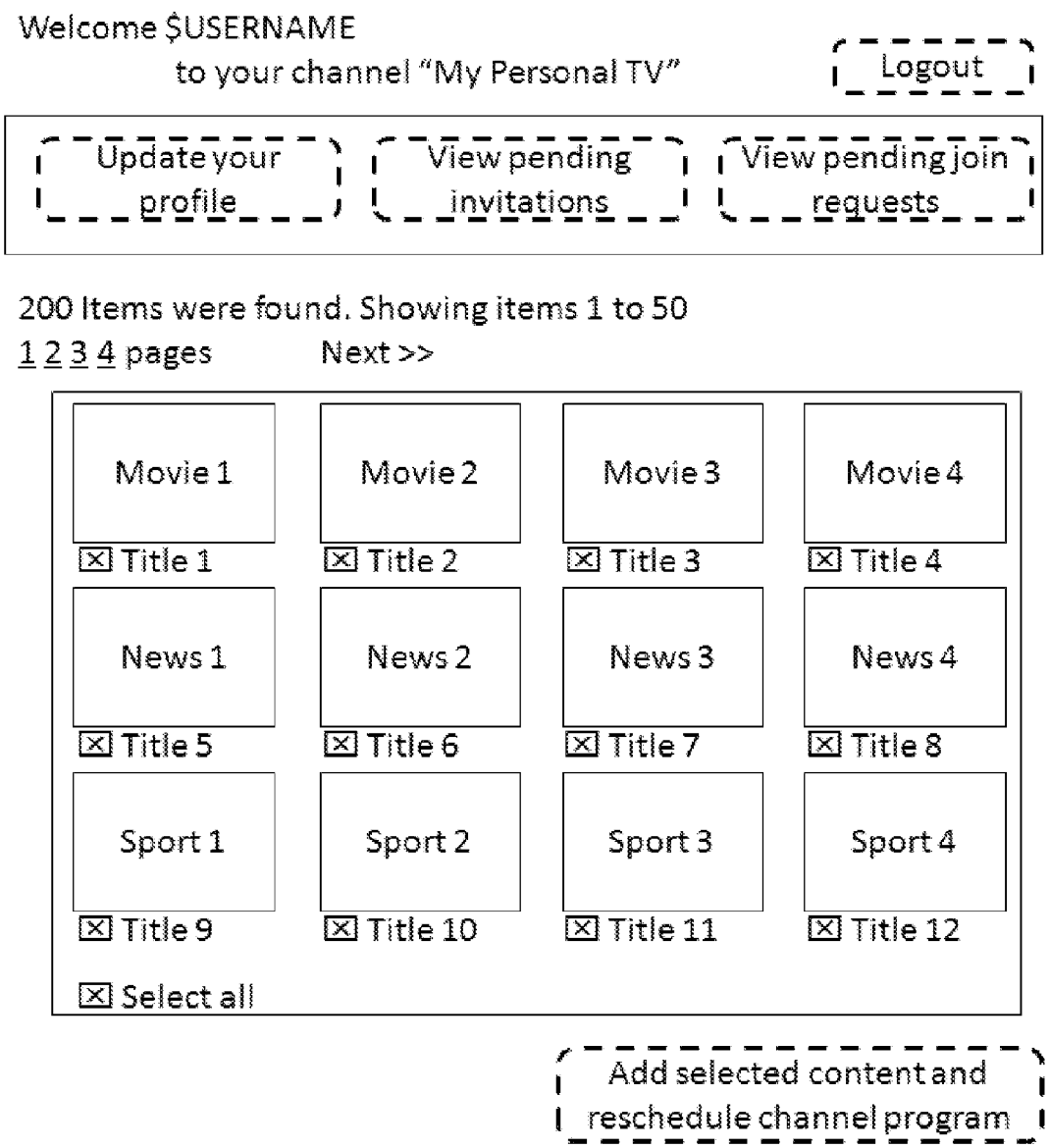
FIG. 6 illustrates an exemplary screenshot of a webpage showing the result of a content search operation.

By clicking on the "Search" button in FIG. 5, the channel owner gets the webpage of FIG. 6, which is an example screenshot showing all content items found matching the search criteria. On the webpage of FIG. 6, with mouse-over the caption of a content item, description of the content item may pop up, indicating different information about the content item (e.g., content description, genre, list of actors, language, director, year of production, etc) available at the content database 204. On the webpage of FIG. 6, the channel owner may uncheck the content items that he does not want to add to his channel program. After determining the content items to be added to the channel program, the channel owner adds the selected content items and enters the content scheduling operation.

FIG. 7 is an exemplary screenshot showing the current channel program and the list of content items that were selected in FIG. 6. At this stage, the channel owner may still remove some content items from the list if appropriate. The scheduling of the selected can be done either manually or via a system recommendation using the content scheduling module 226.

By clicking on the "Schedule Content" of FIG. 7, the channel owner gets an exemplary webpage, as in FIG. 8, whereby the selected content items are added to the channel program as specified by the content scheduling module 226. Depending on the channel type, commercials are also inserted into the channel program as specified by the commercial selection and insertion module 230. If permissible, the channel owner may still replace a recommended commercial as the channel owner may wish. The channel owner can also manually reposition/change the streaming order of the content items into the channel program. Once the channel owner is satisfied with the updated/extended channel program, the channel owner confirms it and may notify the members of the channel's social network with the channel program update. With these operations, the channel owner completes the channel content management procedure. The updated/extended channel program is then stored in the channel database 208.

Figure 9:
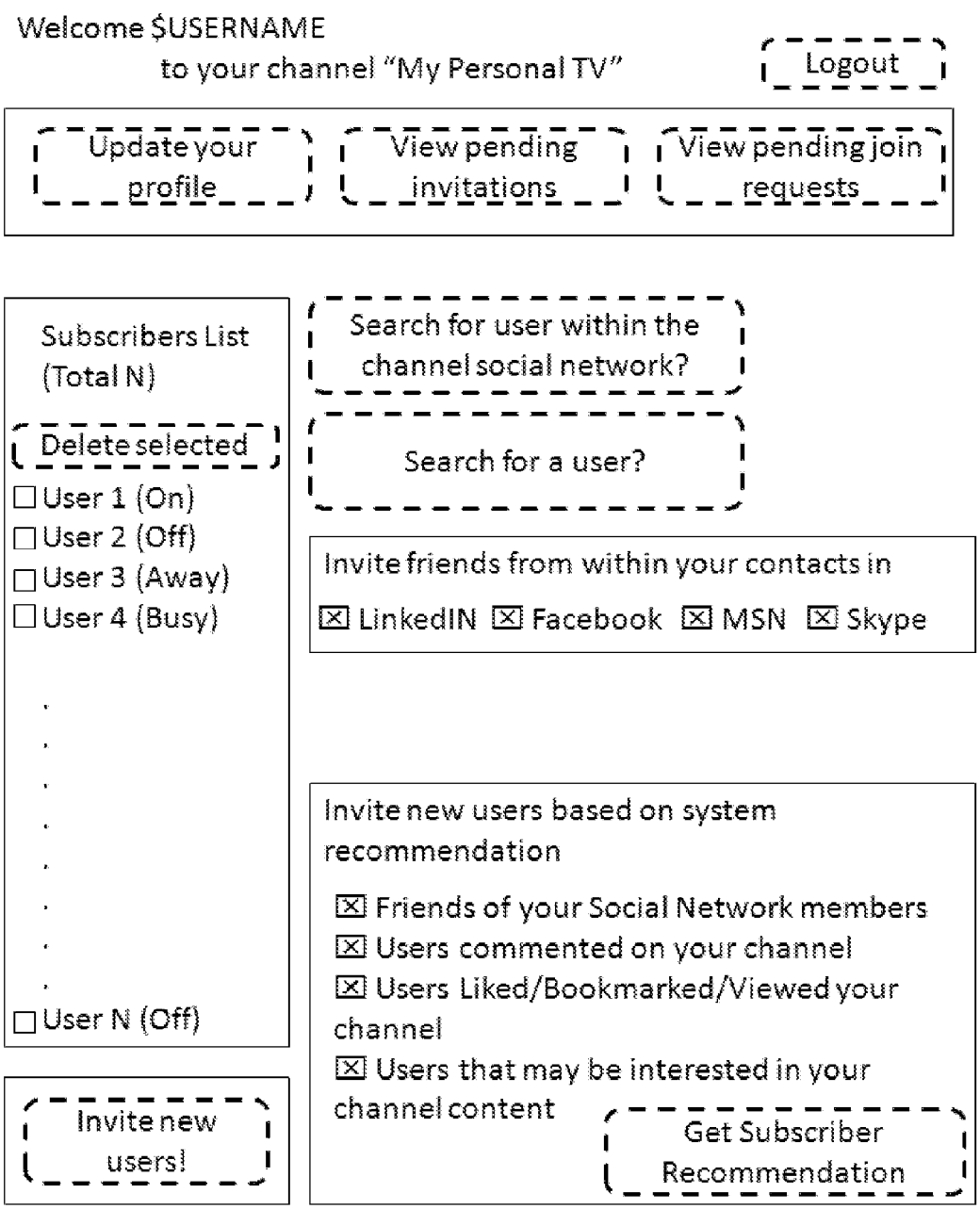
FIG. 9 illustrates an exemplary screenshot of a webpage showing the list of members of a channel's social network and a set of criteria for searching for users to invite to the channel's social network.

The channel owner may want to manage further the channel by returning to the webpage of FIG. 4. The channel owner may also manage the social network of a content channel of his by clicking on the "social network management" button of FIG. 4. The user gets then a webpage as the exemplary screenshot of FIG. 9, showing the list of subscribers of the channel's social network along with their status (e.g., on, off, away, busy, etc). By clicking on a subscriber from within the list, the channel owner may get the profile of the subscriber. The profile may include different information, available at the subscriber database 206, such as a list of preferences of the subscriber, and for privacy concerns and if allowed, the age of the subscriber, his address, the list of his contacts, etc. Using the webpage of FIG. 9, the channel owner may also search for a subscriber from within the channel's social network using the subscriber search module 216. The channel owner may also invite new subscribers to join the channel social's network from within his contacts in other social network platforms such as LinkedIn, Facebook, using an instant messaging software such as MSN, using a voice over IP software such as Skype, etc. The channel owner may also invite new users to the channel's social network based on system recommendation using the subscriber recommendation module 222.

It shall be iterated that the above-disclosed embodiments have been presented by way of example only and not by way of limitation. Various permutations, alterations, substitute equivalents and embodiments, falling within the scope of the present invention, will come to the mind of the one skilled in the art to which the present invention pertains. It shall be thus understood that the above-described exemplary embodiments should not limit anyhow the breadth and scope of a preferred embodiment of the present invention. Indeed, it shall be understood that permutations, modifications, substitute equivalents and embodiments are also intended to be included within the true spirit and scope of the appended claims.

What is claimed is:

1. A method for creating a network protocol based multimedia content channel customized and delivered to an associated social network, and for also creating a social network customized to an associated multimedia content channel comprising:

automatically creating and managing a social network;
automatically selecting content, entirely or partially available at a central server, at a peer to peer network, and/or distributed over a cloud of servers, according to contextual information about the said social network;
automatically creating and managing a channel of said content for the said social network;
automatically scheduling and managing the streaming/playback time of said content of said channel according to contextual information about the said social network, the features of said channel, and the features of said content; and
delivering said content of said channel to the said social network according to said schedule.

2. The method of claim 1, wherein the selection of the social network members, said content selection, and said content streaming scheduling are based on information explicitly indicated by users or based on information obtained using one or more suitable learning algorithms.

3. The method of claim 1, further comprising assessing the reliability and availability of content, and basing said content selection and said content streaming scheduling on said assessed content reliability and availability.

4. The method of claim 1, wherein said content selection and said content streaming scheduling are performed based on the geographical distribution of users such that a particular content item is simultaneously streamed to a maximum number of users of different channels, located in a nearby geographical area.

5. The method of claim 1, wherein said content selection and said content streaming scheduling is further based on information regarding the network topological distribution of content.

6. The method of claim 1, further comprising detecting the unavailability of a content item earlier than its original streaming time and automatically finding replacement for said unavailable content item.

7. The method of claim 1, further comprising providing a user with credentials to securely access a content item from a content provider.

8. The method of claim 1 further comprising forwarding said channel schedule to members of said social network, and storing said schedule locally at respective customer endpoint devices.

9. The method of claim 1 further comprising having a new user join said channel and delivering said content to said new user's customer endpoint device according to the channel schedule.

10. The method of claim 1, wherein a content item, scheduled to be streamed within a channel, can be received earlier than the scheduled playback time, stored locally at the user device and displayed according to the channel program.

11. The method of claim 1, further comprising charging a user, giving a user incentives and applying a penalty in return for special actions performed by said user.

12. The method of claim 1, further comprising intelligently selecting and inserting commercials customized to the features of a channel, the social network of a channel and/or relevant to the streamed content.

13. A computer program product comprising a non-transitory program storage medium readable by a computer tangibly embodying one or more programming instructions executable by said computer, wherein said instructions are configured to perform a method for creating a network protocol based multimedia content channel customized and delivered to an associated social network, and for also creating a social network customized to an associated multimedia content channel, said method comprising:

automatically creating and managing a social network;

automatically selecting content, entirely or partially available at a central server, at a peer to peer network, and/or distributed over a cloud of servers, according to contextual information about the said social network;

automatically creating and managing a channel of said content for the said social network;

automatically scheduling and managing the streaming/playback time of said content of said channel according to contextual information about the said social network, the features of said channel, and the features of said content; and delivering said content of said channel to the said social network according to said schedule.

14. The computer program product of claim 13, wherein the selection of the social network members, said content selection, and said content streaming scheduling are based on information explicitly indicated by users or based on information obtained using one or more suitable learning algorithms.

15. The computer program product of claim 13, further comprising instructions for assessing the reliability and availability of content, and basing said content selection and said content streaming scheduling on the assessed content reliability and availability.

16. The computer program product of claim 13, wherein said content selection and said content streaming scheduling are performed based on the geographical distribution of users such that a particular content item is simultaneously streamed to a maximum number of users of different channels, located in a nearby geographical area.

17. The computer program product of claim 13, wherein said content selection and said content streaming scheduling is further based on information regarding the network topological distribution of content.

18. The computer program product of claim 13, further comprising instructions for detecting the unavailability of a content item earlier than its original streaming time and automatically finding replacement for said unavailable content item.

19. The computer program product of claim 13, further comprising instructions for providing a user with credentials to securely access a content item from a content provider.

20. The computer program product of claim 13 further comprising instructions for forwarding said channel schedule to members of said social network, and storing said schedule locally at their respective customer endpoint devices.

21. The computer program product of claim 13 further comprising instructions for having a new user join said channel and delivering said content to said new user's customer endpoint device according to the channel schedule.

22. The computer program product of claim 13, wherein a content item, scheduled to be streamed within a channel, can be received earlier than the scheduled playback time, stored locally at the user device and displayed according to the channel program.

23. The computer program product of claim 13, further comprising instructions for charging a user, giving a user incentives and applying a penalty in return for special actions performed by a user.

24. The computer program product of claim 13, further comprising instructions for intelligently selecting and inserting commercials customized to the features of a channel, the social network of a channel and/or relevant to the streamed content.

* * * * *